United States Patent [19]

Kassies

[11] Patent Number: 4,509,837
[45] Date of Patent: Apr. 9, 1985

[54] REAL IMAGE PROJECTION DEVICE

[76] Inventor: Michiel Kassies, Rozenstraat 184, 1016PA Amsterdam, Netherlands

[21] Appl. No.: 348,375

[22] Filed: Feb. 12, 1982

Related U.S. Application Data

[63] Continuation-in-part of Ser. No. 182,550, Aug. 29, 1980, abandoned.

[51] Int. Cl.³ .............................................. G03B 21/06
[52] U.S. Cl. ........................................ 353/10; 353/38; 353/81
[58] Field of Search ................. 353/10, 38, 81, 98, 353/99; 350/128, 167, 144

[56] References Cited

U.S. PATENT DOCUMENTS

| | | | |
|---|---|---|---|
| 3,014,403 | 12/1961 | Alofs | 353/38 X |
| 3,090,280 | 5/1963 | Winter | 353/28 |
| 3,567,319 | 3/1971 | Gaston | 353/102 |
| 3,692,399 | 9/1972 | Stewart | 353/99 X |
| 3,744,893 | 7/1973 | Chandler | 353/97 X |
| 3,820,885 | 6/1974 | Miller | 353/98 |
| 4,261,657 | 4/1981 | Reiback | 353/10 |

FOREIGN PATENT DOCUMENTS

| | | | |
|---|---|---|---|
| 400182 | 5/1909 | France | 353/98 |
| 19823 | of 1911 | United Kingdom | 353/30 |

Primary Examiner—Harry N. Haroian
Attorney, Agent, or Firm—Townsend and Townsend

[57] ABSTRACT

An optical display device for creating the of an object out in space in front of the viewer. The device uses an illuminated object, with a transparent medium in the form of a prism or fluid placed between a beam splitter and a matrix of retroreflectors for deflecting the light rays from the illuminated object back toward the object.

7 Claims, 19 Drawing Figures

REAL IMAGE PROJECTION DEVICE

This application is a continuation-in-part of application Ser. No. 06/182,550 filed Aug. 29, 1980 now abandoned. This invention relates to a symmetrical device.

SUMMARY OF THE PRIOR ART

Stereoscopic projection devices are known utilizing retroreflective screens. See Gordano, U.S. Pat. No. 3,200,702 entitled "Stereoscopic Projection Apparatus," issued Aug. 17, 1965.

Cameras which register a multiplicity of images are also known. These images, when viewed through a matrix, reproduce a three-dimensional view of the object when seen by a viewer. See Benton, U.S. Pat. No. 3,657,981, entitled "Direct Orthoscopic Stereo Panoramic Round Camera," issued Apr. 25, 1972.

Neither of these devices constitutes the reconstruction of light utilizing the natural light rays and a symmetrical imaging device such as a reflecting screen or specialized rear projection screen.

SUMMARY OF THE INVENTION

An object has light reflected or emanating therefrom projected through a symmetrical imaging device. The symmetrical imaging device contains a reference plane where the light impinging thereon has its direction changed or altered. The symmetrical imaging device relative to the reference or symmetry plane has optical properties restricting the transmitted ray from the symmetrical imaging device to lay into a normal plane containing the incident ray and the normal to the reference plane at the point of incidence. The angle of incidence is equal to the angle of transmission, but is contained on the same side of the normal (where the angle of incidence is the angle between the incident light ray and normal, the angle of transmission is the angle between the reflected light ray and normal). In the retroreflecting aspect of this invention, each light ray is reflected precisely back upon itself before or after this light ray is specularly reflected by a partially transparent medium which surface is usually coinciding with the aforementioned reference plane. In the light deflection form of the invention that uses deflection or reflection of a combination of these aspects for transmission, here the device has a plane shape rather than a box shape and light from an object on one side of the device will be thrown to the opposite side of the device rather than sideways to the device in both cases. In either case, the light projected by the device forms images of objects in space. The image will be in precise symmetry with the object relative to the symmetry plane. In the deflecting aspect of the invention, the plane shape of the device is usually coinciding with the reference plane. The properties of the symmetrical imaging device about the reference plane differ from the law of reflection in that the angle of incidence and the angle of transmission are on the same side of the normal. Moreover, the produced image distinguishes from that conventionally produced by one lens or parabolic mirror because the distance between a reference plane relative to the symmetrical imaging device and object is equal to the distance between a reference plane relative to the symmetrical imaging device and image, when the reference plane is a straight flat plane. In the case of a retroreflecting device, light must be detoured as by a beam splitter, to produce a symmetrical image capable of having dimensional qualties. Various embodiments of the invention include schemes for shading the device from unwanted light, extending the viewing area, and projecting a plurality of images. Other embodiments include a prism structure for the device and arrangements of the device for achieving various special effects.

OTHER OBJECTS, FEATURES AND ADVANTAGES

An object of this invention is to disclose the projection of an image utilizing the reflected light from an object such as that seen in the real world. According to this aspect of the invention, the object is conventionally illuminated, for example either by front illumination in the case of an opaque object or by rear illumination in the case of a translucent object. Light from the object is projected through a symmetrical imaging device. The symmetrical imaging device has a reference plane where light incident upon the device has its direction changed and the light with changed direction is transmitted from the device. All points on the reference plane are active over the surface of the reference plane in accordance with the following rule.

The symmetrical imaging device relative to the reference plane has optical properties restricting the transmitted ray from the symmetrical imaging device to a normal plane containing the incident ray and the normal to the reference plane to the point of incidence. The angle of incidence is equal to the angle of transmission but is contained on the same side of the normal (where the angle of incidence is the angle between the incident light ray and a normal and the angle of transmission is the angle between the reflected light ray and a normal).

Images from objects projected further apart from the device than the object versus distance to the device will also become visible and appear to be reversed left-right and upsidedown.

Other than for viewing or projecting images, the devices can be used for the multiple functions usually performed by lenses and parabolic mirrors.

A further object of this invention is to disclose a screen for transmitting from one side of the screen an image of an object to the opposite side of the screen. This is previously called the deflective form of the device. In this aspect of the invention, the image from the device is a precise reciprocal of the object projected by the device. For example, an image of what is essentially a convex human contour would appear reciprocally as an image of a concave human contour.

An advantage of this invention is that the image, unlike that produced through a positive spherical lens or parabolic mirror, is at the same distance from the retroimaging device as the object when the image is reflected from the reference plane. Thus, by increasing the distance of the object from the retroimaging device, one can increase the distance from the image and retroimaging device. For example, utilizing this invention a three-dimensional reciprocal image of an object can be easily cast out into the street through a storefront window.

A further advantage is that by using reciprocal objects, one can cast an image of a real world object.

For example, by imaging the concave features of the human mask, one can image with reverse parity the exterior of a human face.

A further function of one part of this invention is to adapt a beam splitter to a retroreflecting screen to the casting of such images. According to this aspect of the invention, the beam splitter is placed at an angle between an illuminated object and a retroreflecting screen. Light impinging upon the beam splitter from the retroreflecting screen is detoured outwardly and away from the screen path back to the object. Being so detoured, a reciprocal image is formed. The formed reciprocal image may then be viewed as being real, and out in space in front of the viewer.

A further object of this invention is to provide a shade on an opposite side of the beam splitter from the retroreflector. An advantage of using the shade is the blocking of virtual images of the environment from transmission to a viewer of the formed image.

Additionally, the shade may comprise a louvre screen having angular elements and being placed in the light path. In addition to blocking transmission of virtual images of the environment, the louvred screen reduces visibility of the object itself, as opposed to the projected image of the object. A further object of the present invention is to include a partially absorbtive screen on the viewing side of the beam splitter. An advantage of this arrangement is reduction of wash-out due to light from the viewing side entering the device. Such object may be accomplished by forming the screen from a light polarizing filter or a color filter.

An additional advantage of this arrangement may be seen by including a louvre screen at the point where light enters the device from the object and at the point where light leaves the device to form the projected image. In this arrangement, the louvred screen is also placed proximate to the retroreflector surface. An advantage of this arrangement is the reduction of wash-out due to excessive object light and/or ambient light striking the retroreflector at non-transmissive angles that would interfere with the image being projected.

Another object of the present invention is to provide special effects by combining an imaged object with a non-imaged object. The non-imaged object may be a flat two-dimensional object or it may be a solid object held in the image viewing area. The advantages of such arrangement are increased versatility. Since it is contemplated that the invention will often find applications in commercial settings, the user of the invention is afforded a wide variety of "eye-catching" options.

A further object of the present invention is to provide a device with as wide a viewing area as possible for the projected image. In keeping with this object, specular elements such as mirrors or retroreflectors may be placed at either side of the beam splitter. Such improvements in view area will add to a brighter image in the case that the device is used for non-aerial projection such as on a diffuse screen or in electronic image recording. Additionally, the retroreflector may be extended to the sides of the beam splitter and/or curved inwaardly to extend the viewing angle. The viewing range may also be extended by adding additional retroreflectors. An advantage of this extended viewing range is self-apparent: the wider the viewing range, the longer the projected image is available for viewing by its intended audience.

Still another object of the present invention is to provide a plurality of beam splitters such that the image is projected at a plurality of locations. Thus, the image may be formed at a series of locations or in a circular display. An advantage of this arrangement is using one device to form several images for viewing at more than one location by more than one viewer.

Still another object of this invention is to provide a transparent medium between the beam splitter and the retroreflector such as a prism or a fluid filled prism. The properties of a prism are: they bend light and the medium of which the prism is constructed may have an index of retraction greater than that of air. Thus, a more efficient device may be constructed. Further advantages of this arrangement include simplicity of construction for less expense and with increased versatility. For example, the retroreflector could be a series of cube corners formed integrally with the prism or it could be a curved surface. Furthermore, the surfaces of the medium could be coded or scrambled to reduce distortion due to interference of light.

Still another object of the present invention is to provide a beam splitter that is movable within the light path for spacially moving projected image. An advantage of this arrangement is the addition of motion to the image. By moving the beam splitter, the image appears to be drifting in and out as the beam splitter moves toward and away from the object.

A further object of the present is to provide a retroreflector having light openings by which the pattern of the light openings in the retroreflector forms the image to be projected. One advantage of this approach is that viewing area of the image is increased. By using interchangeable retroreflectors having varying light opening patterns, a versatile display is possible. A further advantage of this aspect of the present invention is that dated material or material of periodically changing nature may be readily substituted in the device for that which was previously there.

Additionally, another object of the invention is to provide a device for imaging electronic displays. In this application, the present light imaging device is interfaced to an electronic display, such as a cathode ray tube. The image formed on the screen of the cathode ray tube is then projected through the device and forms an image in the imaging area of the device. Possible advantages of this system would be to add three dimensions to a moving image or to add a greater sense of depth to an image. A further advantage is to bring an optical image (such as from a television) closer to a viewer without loss of viewing area.

Another object of the present invention is to provide a beam splitter having a series of silver dots with dark backing on a glass substrate. Such a beam splitter has the properties of being reflective on one side and nonreflective on the other side; the beam splitter is transmissive through both sides. Such a beam splitter improves the efficiency of the present invention.

Other objects, features and advantages of this invention will become more apparent after referring to the following specification and attached drawings.

Figure 1A:
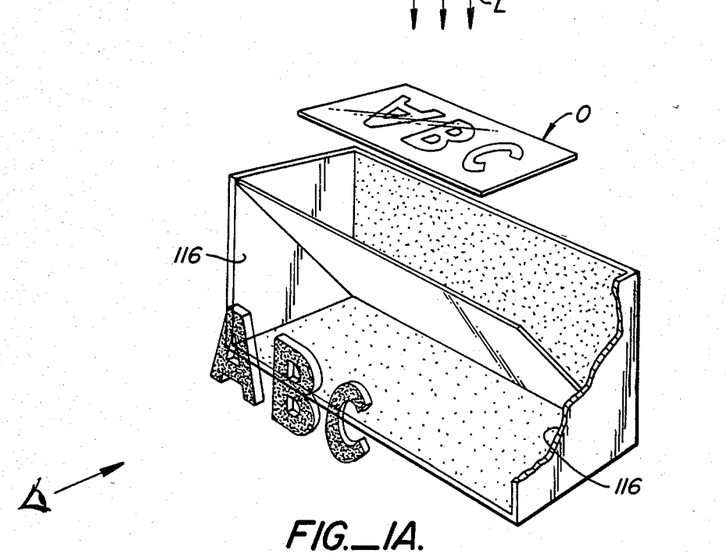
FIG. 1A is a three-dimensional view of the projection device in this invention utilizing a retroreflecting screen and beam splitter to create a reciprocal image of the letters "ABC"

Referring to FIG. 1A, an object O is illuminated by a light source L which light source is only schematically shown. In the view of FIG. 1A, the object happens to be transparent or translucent. The light thus can be projected from the rear thereof.

Figure 1B:
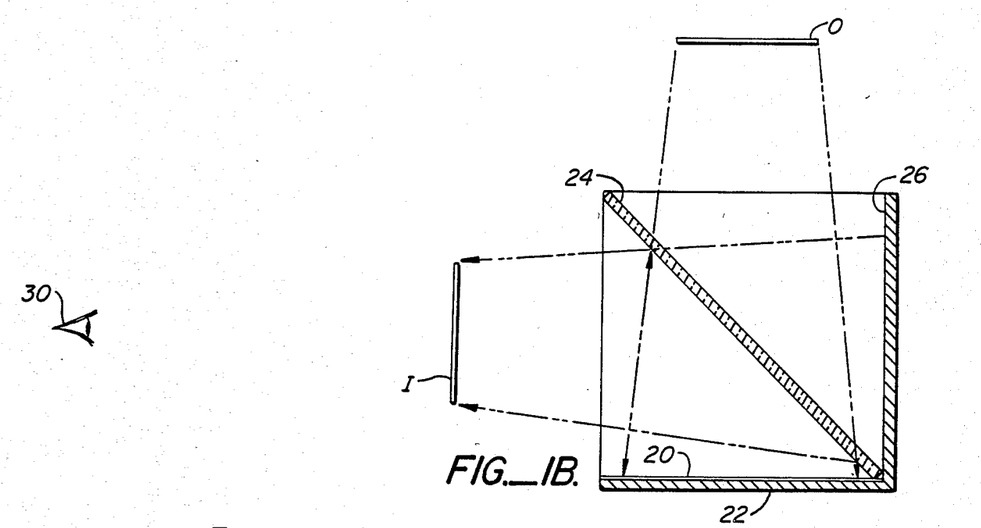
FIG. 1B is a side perspective view of FIG. 1A illustrating the property of the invention whereby the image is thrown some distance from the projection device.

Referring to the view of FIG. 1B, the light from the object passes to a retroreflecting screen 20 mounted on the base of a three-sided box 22. Light from the retroreflecting screen returns directly to the object O.

As those having skill in the art know, a retroreflecting screen returns the light impinging upon it with the precise angularity as the light is received from an object. Thus, and assuming no beam splitter 24 intermediate the object O and retroreflecting screen 20, one would expect that the light would reflect back upon and enhance precisely with a real image the real world object O.

Interposition of the beam splitter 24 at a preferred 45 degree angle changes this. Specifically, the beam splitter causes at least some of the converging light to be detoured to an image plane I. At the image plane I the image of the object (here shown as the letters "ABC") is recreated. As the image is recreated, a viewer having a perspective from a solid angle of projection equal to the solid angle of projection of the retroreflecting screen and the beam splitter can see the letters ABC projected in space. Similarly it can be cast on a screen or be recorded.

In actual fact, the retroreflecting screen could be mounted on the end of wall 26 of the box 22. However, in this location a viewer of the image I such as that schematically shown by the eye 30 would in FIG. 1B have a bright and illuminated background against which to view the image. As a bright and illuminated background would detract from the intensity of the image, it is usually preferred to mount the retroreflecting screen 22 so that the viewer has light passed to his view with a relatively dark background. Typically end wall 26 is painted with a dark, light absorbative coating such as non-glossy black paint and the like.

It is also important to distinguish this invention from that of the conventional law of reflection. Taking the case of a retroimaging screen, it will be understood that the screen has a theoretical reference plane in which light changes its direction. This screen has optical properties restricting the transmitting ray to the retroreflecting screen to a normal plane containing the incident ray and the normal to the reference plane within the screen at the point of incidence. The angle of incident is equal to the angle of transmission, but is contained on the same side of the normal. The angle of incidence is defined as the angle between the incident light ray and a normal and the angle of transmission or reflection is defined as the angle between the reflected ray and a normal.

It is important to distinguish this projection system from that of a conventional lens. Specifically, in the case of a lens, a reciprocal image moves. Where the object is far away, the image moves to the focal point of the lens. Conversely, where the object approaches the focal length of the lens, the image is projected at increasing distances. A reciprocal relationship results.

Here, between the image and the object there is a direct relationship. Specifically, the relationship is that the object to symmetry imaging device distance will always remain the same as the image to symmetry imaging device distance. When the symmetry of plane is chosen to be nonreflecting, e.g. by use of curved beam splitter, or by use of a curved rear deflector, the image will be deformed according to the same rules of symmetry.

This latter rule produces an images some effects which are not immediately apparent. Take, for instance, the image of a human face. Typically, the nose of a human face will be closer to the projection screen than the ears of the human face.

The projection of a reciprocal image will give an opposite result. Specifically, the human image will have the nose closer to the projection device than the ears. Thus, images projected by the device will be reciprocal. It will be as if one is viewing a mask from the inside.

An expedient to correct this reversal of distance parity is to utilize for the object a mask. Thereafter, the projected image will be a real life image.

As will hereinafter be briefly discussed, and in the case of stereoscopic projection, is is necessary to reverse the right-left parity to prevent pseudoscopic images.

Figures 2, 3A, 3B, 3C:
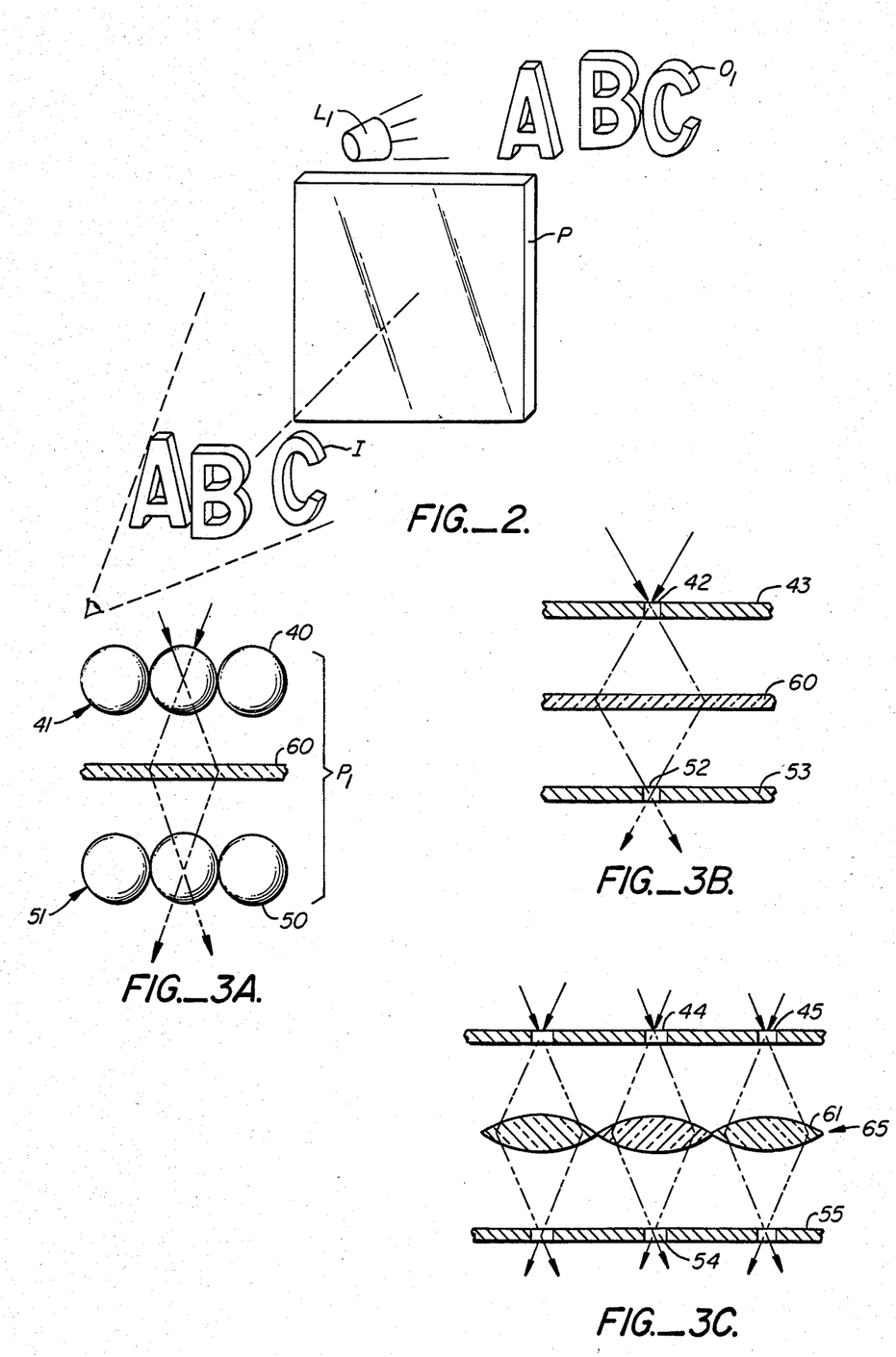
FIG. 2 is an embodiment of this invention similar to FIG. 1, the embodiment therein illustrating a retroprojection device, which retroprojection device throws the reciprocal of the letters to a new location.
FIGS. 3A-3C are all embodiments of specialized screens which can be used with the embodiment of FIG. 2.

Having discussed an embodiment of this invention utilizing a retroreflecting screen, attention now can be given to the projection of an image using retroprojection devices such as illustrated in FIGS. 3A, 3B and 3C. This will first be discussed with respect to FIG. 2.

Referring to FIG. 2, a light source $L_1$ illuminates an object $O_1$ in the form of letters ABC deflective re a projection. A device P is illustrated. The property of device P is exactly similar to that of the retroreflecting screen 22. Specifically, reflected or emanating light will diverge from each point on object $O_1$ (letters ABC). It will impinge upon the screen device P. Light will be projected from the screen device P, converging to an image I of the letters ABC in the same, exact and identical angularity as light projected from the letters ABC onto the screen device P. There results projected in space a reciprocal image of the letters ABC.

The construction of the projection device P can take several forms, which forms can all be easily understood with reference to FIGS. 3A, 3B or 3C.

Referring to FIG. 3A, a device $P_1$ is shown consisting of glass bead lenses 40 aligned in a matrix 41 on one side of screen 60 and glass bean lenses 50 aligned in a matrix 51 on the opposite side of screen 60. A rear projection screen 60 sits intermediate the lens matrixes 41, 51.

The resulting projection system is easy to understand. Specifically, light from all angles is imaged through matrix 41 onto the rear projection screen 60. At the rear projection screen 60, the light is then seen by the matrix of lenses 51 and each individual lens 50 causes light to emanate from the rear side of the rear projection screen 60 with the exact same and precise angularity as the light was received. There will result a recreation of the images as described.

The same effect can be produced using pinholes. A device utilizing pinholes is illustrated in FIG. 3B.

In FIG. 3B, a rear projection screen 60 is shown having a series of individual pinholes 42 aligned in a matrix 43. Conversely and at the opposite side there are pinholes 53 aligned in a matrix 53. The result is the same. Specifically, light enters and forms an image on the rear projection screen 60. This image is seen at each of the pinholes with the light exiting through the pinholes. The angularity assigned to an outgoing ray is the reciprocal of the light to an incoming ray. Therefore, an image can be formed in the manner illustrated in FIG. 2.

It will be apparent that if matrixes differ in size, enlargement is possible. Therefore, it is mentioned that the idea must be interpreted as wide as possible.

Referring to FIG. 3C, yet another embodiment is illustrated. In particular, a matrix of positive spherical lenses 61 is illustrated. Each lens is aligned between paired pinholes 44 towards the object and 54 towards the image. As before, these respective lenses 61, pinholes 44, 54 are aligned in respective matrices 45. 55.

It will be seen that the separation between the matrix of pinholes 45 and the matrix of pinholes 55 is chosen to be the exact focal length of each of the lenses 61 of the lens matrix 65. With this property, the light rays pass along the illustrated path and each entering light ray enters with an angle equal and opposite to each exiting light ray. Again, the screen illustrated in FIG. 3C will produce a symmetry imaging characteristic such as that previously illustrated.

Reviewing the device of FIGS. 3A, 3B and 3C, again it can be seen how the generic definition of symmetrical imaging devices aptly describe their function. Each device has a plane where the light changes direction. The symmetrical imaging device relative to its reference plane has potical properties restricting the transmitted ray from the symmetrical imaging device to a normal plane containing the incident ray and the normal to the reference plane at the point of incidence. The angle of incidence is equal to the angle of transmission, but is contained on the same side of the normal. The angle of incidence is the angle between the incident light ray and the normal and the angle of transmission is the angle between the transmitted ray and a normal. Where transmission of a light image of the object occurs from one side of the device to the opposite side of the device, it will be seen that there results an image.

It will be seen and realized that the images created are not those conventionally created by spherical lenses. Moreover, the image is to be distinguished from any illuminated object merely placed in front of a retroreflecting screen. Where an illuminated object is placed in front of retroreflecting screen, an image of that object is case right back precisely upon the object itself. Here and in this invention, the image of the object must be cast somewhere other than back upon the object itself. It is the realization that the image exists that is one of the important aspects of this invention.

Figure 4:
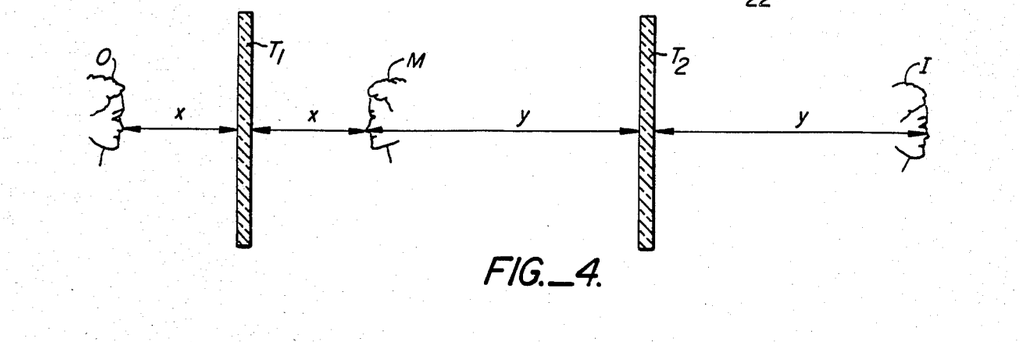
FIG. 4 is an embodiment of the invention wherein two symmetrical imaging devices are used so as to project the image of the object (leftmost face) appears the same as the object.

Referring to FIG. 4, a symmetrical imaging device for transmitting an image is shown. An object O, here in the form of the human face, is placed on one side of a first transmission device $T_1$. It casts a reciprocal image in the form of a mask M on the opposite side thereof. The image of mask M is then taken by a second image transmission device $T_2$. This image transmission device forms an image of the human face at I.

It can be seen that with the above-described reciprocal imaging device, the image of the face may be reproduced. It is seen that as the object O is moved toward the right the image I will also move toward the right. Further, both object and image will move at the same speed.

I have just finished illustrating with respect to FIG. 4 two symmetrical imaging devices wherein an image from an object on one side of the device is relayed to the opposite side. This image is in turn re-relayed by a second symmetrical imaging device to produce a real parity image. Those having skill in the art will realize that the retroreflecting scheme that I have illustrated with respect to FIGS. 1A and 1B could as well be used twice to restore parity to the image.

Figure 5:
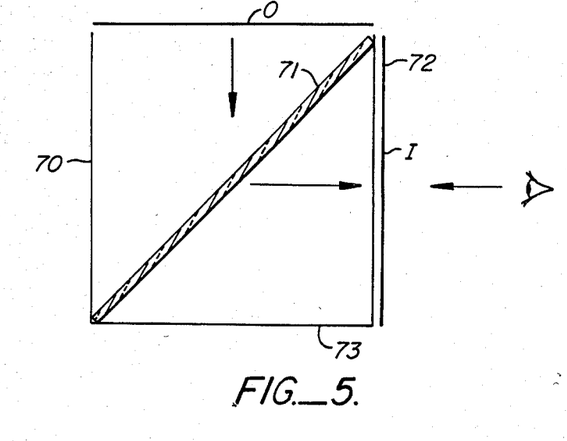
FIG. 5 is a schematic of an embodiment of the invention wherein various shading and interference reducing components may be interchanged to suit the device to various applications.

Referring now to FIG. 5, various design options resulting in different device characteristics for different applications are described. The device may have a pair of retroreflectors at locations 70 and 73 in FIG. 5. With two retroreflectors gathering and reflecting light the image will appear brighter.

Ambient light may be a problem; unwanted object light may also be a problem. Various placements of different components are available for alleviating this problem. In FIG. 5 location 70 may be a shade for blocking environmental or ambient light that may interfere with the image from behind. Alternatively, a shade may be located at position 73.

Figure 6A:
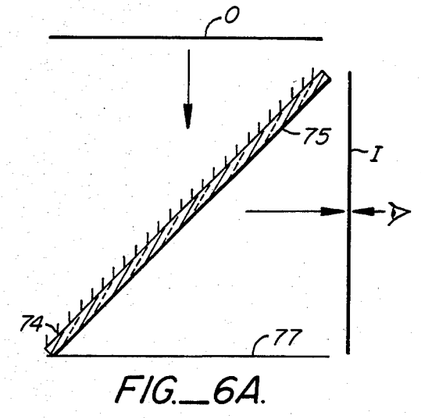
FIG. 6A is a schematic of a beam splitter having a louvred screen for preventing interference due to unwanted light.

Referring to FIG. 6A, a louvred screen 74 is placed in proximity to beam splitter 75. Object light strikes retroreflector 77 and is projected to form an image I. An advantage of this arrangement is that unwanted light from behind or above is blocked by the louvres and not passed through the beam splitter to the retroreflector 77.

Light from the front and from behind in the image forming area may be rejected by interposition of a screen 72 (FIG. 5) made of a partially absorptive material. The screen may be a light polarizing filter to reject light not of the desired polarity. Additional polarizing filters may be included to achieve cross-polarization. By adding the screen, the floating or three-dimensional effect of the image is lost if the screen is placed in the image forming area. If the screen is placed before the image forming area, it must have properties such that it will transmit the image. In this case, wash-out due to light from the viewer's side of the beam splitter is diminished.

Figure 6B:
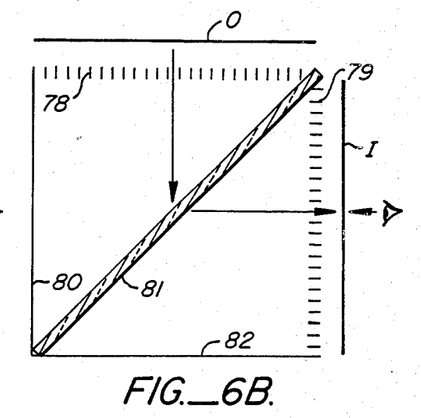
FIG. 6B is a schematic showing a pair of louvred screens provided in the object area and image viewing area for preventing interference due to unwanted light.

FIG. 6B shows an arrangement of louvred screens 78 and 79. Light from the object O is reflected from beam splitter 81 to retroreflector 80. The light from the object O also passes through the beam splitter to retroreflector 82, the image is formed at I. In this arrangement the object cannot be directly viewed and does not interfere with the projected image. Alternatively, location 80 or 82 could be a shade.

Louvred screens 78 and 79 reject unwanted ambient light. Louvred screen 78 rejects unwanted light from above and behind the screen; screen 79 rejects light from above and in front of the image. Thus, wash-out and degredation of the image is diminished.

Figure 6C:
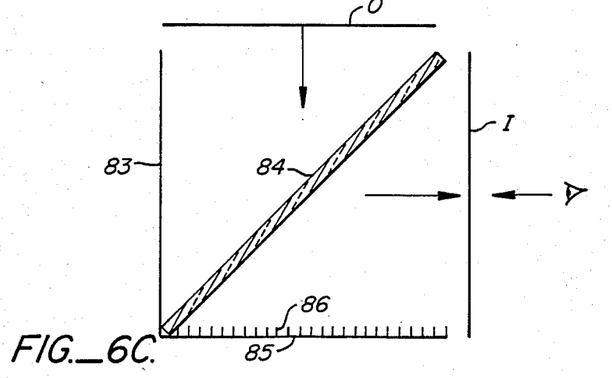
FIG. 6C is a schematic of an embodiment of the invention showing a louvred screen proximate to a retroreflector surface for eliminating interference due to unwanted light.

In FIG. 6C a retroreflector 85 has been fitted with a louvred screen arrangement 86. An object O casts light upon the retroreflector 85 which light is reflected to form an image I by beam splitter 84. Light from the rear is shaded by shade 83. The louvres 86 reject unwanted object or ambient light that may strike the retroreflector 85 at an angle not condusive to proper transmission from the beam splitter 84 to the imaging area. Thus, interference from object or ambient light is prevented.

In a commercial setting, various optical deceptions may prove to be of an attention-getting nature. Referring to FIG. 5 location 70 could be a two-dimensional object that is clearly visable in the image viewing area. Thus, when object O is projected to form image I, the image will appear to float in front of a two-dimensional object displayed on 70. For example, the two-dimensional object formed on 70 could be a background with the image I projecting out of said background. Alternatively, the object could be placed on beam splitter 71.

Figure 7:
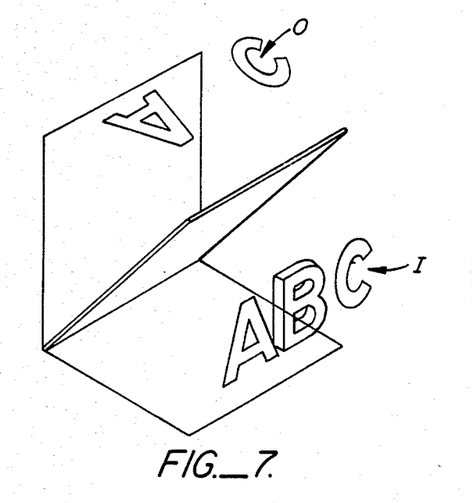
FIG. 7 shows is a schematic of an embodiment of the invention wherein a solid object is placed in the imaging area.

Alternatively, a three-dimensional object could be placed in the image viewing area. Thus, in FIG. 7 letters "A" and "C" are projected as image I. The letter "B" is a solid object suspended in the image viewing area. A person reaching out to touch the objects would not be able to touch the "A" or the "C", but would be able to touch the "B". One possible application might be to project an image behind the object suspended in the image viewing area. When the object is removed for inspection, the image of the object is projected in the object's place so that the object appears to still be in the place from which it was removed. The extra objects may enhance a visual reference.

Figure 8:
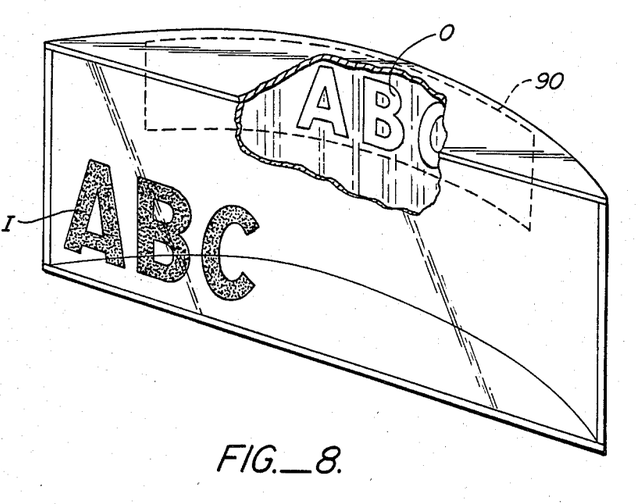
FIG. 8 is a schematic of an embodiment of the invention showing a curved retroreflector for extending the angle of visability of the formed image; and showing a pattern of light openings in a retroreflector as an object to be imaged.

It is desirable to have the object viewed from as wide an angle as possible such that as many persons may view it at one time from as many different directions as possible. To this end, specular elements may be placed at either end of the beam splitter in the device. These elements may include end mirrors or retroreflectors 116 (FIG. 1A). Also a lenslike or prism type set of deflectors can be used without distorting the so produced image if they are placed symmetrically about the beam splitter. Alternatively, the viewing range may be extended by providing for an inwardly curved retroreflector 90 (FIG. 8).

Figure 9:
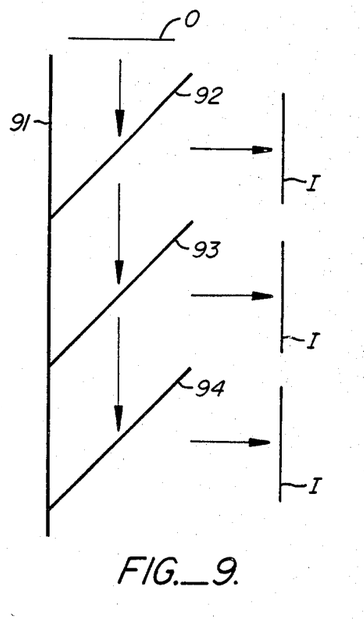
FIG. 9 is a schematic of an embodiment of the invention wherein a series of beam splitters are used to form a series of images from one object.

Another novel embodiment of the present invention is shown in FIG. 9. An object O is reflected from beam splitters 92, 93, 94 onto retroreflector 91. Retroreflector 91 projects the image through the beam splitters to form a series of images I in the image viewing area. One wholly distinct and separate image is formed for each beam splitter. Thus, a series of images may be displayed alongside one another, one of which may be the object. Alternatively, the images may be projected circularly by arranging the beam splitters in a radial fashion. Additionally, the beam splitters may be arranged such that the object may be projected in all directions such that the object is viewable from all angles.

Up to this point the discussion has centered on imaging devices using air as a medium of transmission. It is possible to interpose a transparent medium between the beam splitter and the retroreflector, the medium having an index of refraction higher than that of air. In this way, the light rays would be guided along the light path from the object to the image.

Figure 10:
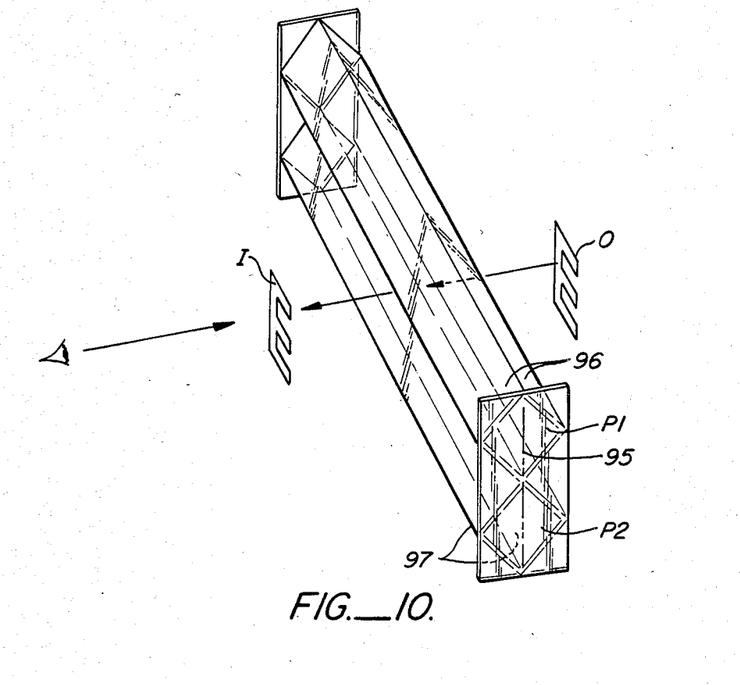
FIG. 10 is a perspective view of an embodiment of the invention wherein two prisms guide object light rays to form the projected image.
Figure 11A:
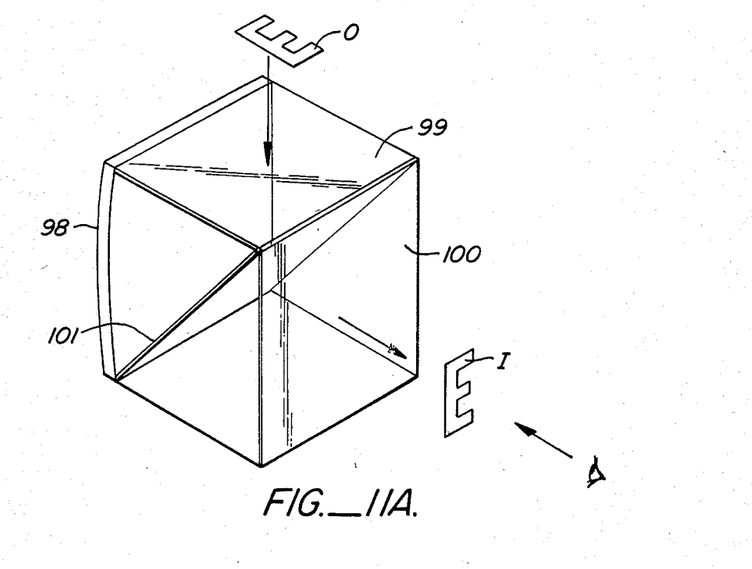
FIG. 11A is a perspective view of an embodiment of the invention having a pair of prisms with a curved retroreflector/prism interface.
Figure 11B:
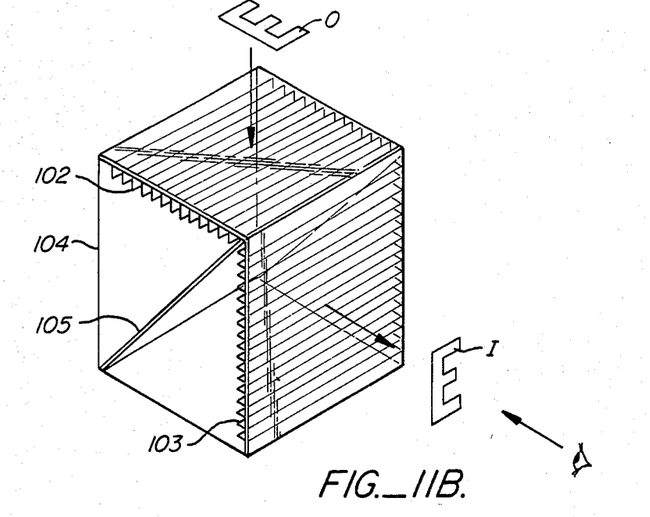
FIG. 11B is a perspective view of an embodiment of the invention showing fluted or scrambled object and image forming surfaces on a device comprised of two prisms.

One way to accomplish transmission through a transparent medium would be to use a prism arrangement (FIGS. 10 and 11). Operation of the device using a prism as a transmission medium would be as with other configurations. Referring to FIG. 10, an object O is placed before the double prism configuration. Light entering the upper prism $P_1$ from the object is retroreflected by retroreflecting surfaces 96. Beam splitter 95 projects the image. Light entering lower prism $P_2$ is reflected off of retroreflectors 97 and is projected as image off of a lower portion of beam splitter 95. The images converge in the image viewing area forming perceived image I.

An advantage of using prisms is that the device may be made in one solid piece. In this way, greater accuracy is achieved at an increased economy of manufacture.

There is occasionally specular interference at the interface of the prism medium with the retroreflectors. The retroreflectors may be formed from triple mirror cube corners and may be mounted integrally with the prism. By using triple mirror cube corners specular interference is eliminated. Alternatively, a curved retroreflector 98 may be used (FIG. 11a) such that specular rays resulting from reflection at the retroreflector and prism interface are focused at infinity.

For large devices and prism arrays, the configuration of FIG. 10 may be made of plastic or glass with a hollow interior. The interior may be filled by any light conducting fluid, such as: water, other liquids, or certain light conductive gases.

FIG. 11B shows another embodiment of the prism imaging device. In this embodiment, object O reflects light rays through scrambled surfaces 102 on the object side of the prism. These light rays are reflected from beam splitter 105 to retroreflector 104. There they are projected through scrambled surfaces 103 to form image I. Scrambled surfaces 102 and 103 are aligned in such way that only image-forming light is projected through the device to form image I. Ambient or environmental light interference, as well as object light interference, are eliminated or distorted.

Figure 12:
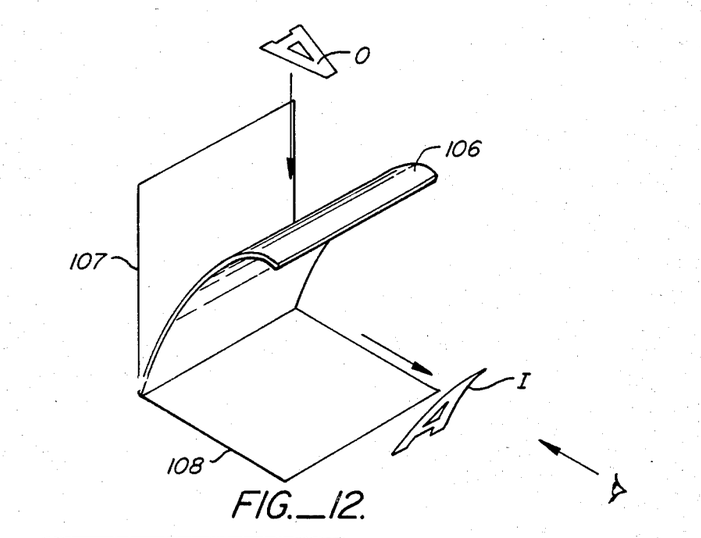
FIG. 12 is a schematic of an embodiment of the invention showing a curved or moveable beam splitter for creating a distorted or pulsing image from a stationary object.

FIG. 12 shows an object O, retroreflectors 107 and 108, and an image I. Beam splitter 106 is of a design such that it may be mechanically or otherwise moved in and out. In this way, the object is brought closer to and further from the beam splitter 106. Since this is a symmetrical device, the formed image appears to move further and closer when viewed by a viewer, and image motion is suggested.

Another variation of the embodiment shown in FIG. 12 is to bend the beam splitter 106 or otherwise distort it. In this way, the object O forms a distorted image I. This may result in a "fun-house mirror effect" or an increase or reduction in image size depending on the distortion introduced into the beam splitters.

It is possible to form a pattern in the retroreflector surface for admitting light into the imaging device as is shown in FIG. 8. Thus, light admitted through the object O in FIG. 8 is reflected from beam splitter 110 to retroreflecting surface 90 and thence to form image I in the image viewing area. If the light openings have angularity, view angle is enhanced and direct object visibility is diminished.

An advantage of this embodiment of this invention is the possibility of interchanging the message displayed by the device. Thus, dated or periodically changed information (such as movie marquee information), may be kept current with great economy and ease of operation.

It is possible to replace the object in any of the aforementioned embodiments of the invention with an electronic display, such as the cathode ray tube. In this way, a moving or electronic object may be projected to the image viewing area. Such an arrangement would give a three-dimensional effect to otherwise flat moving scenes. The symmetrical imaging device does not require external electronic components or lasers to operate; it is readily attached to an electronic display without complicated interfacing. Such an application would produce a color-correct projected image having little or no distortion.

Figure 13:
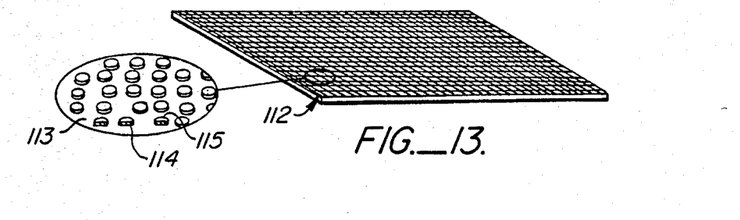
FIG. 13 is a perspective view from an edge of a beam splitting mirror having a reflective metallic dot matrix and a dull coating on the reflective matrix such that one side of the beam splitter is reflective, the other side is not reflecting, and both sides are transmissive.

In certain embodiments of the invention, the beam splitter is a perforated mirror, which mirror is a novel and unique development integral to the development of this invention. Referring to FIG. 13, the mirror 112 is formed on a sheet of glass 113 or other such light transmissive medium. A matrix of reflective dots 114 is formed on one surface of the glass. The matrix may be formed from silver or other such reflective metals or materials. The back of the reflective material may be coated with a non-reflective dull paint 115 or other such coating (such as a background image). The resulting "perforated mirror" has the characteristics of being light transmissive in both directions and light reflective in only one direction. Such a mirror is ideally suited for applications involving the symmetrical imaging device.

It will be apparent to those skilled in the art that the invention contained herein is limited only by the following claims.

I claim:

1. A symmetrical imaging device for projecting an image of an illuminated object at a preselected distance from said imaging device, said symmetrical imaging device comprising in combination:
   an illuminated object;
   a matrix of retroreflectors for deflecting light rays from said illuminated object impinging on said matrix of retroreflectors back toward the object in an opposite direction along a same light path as said rays travelled toward said retroreflectors;
   a beam splitter in said light path for projecting said image at a place other than said object;
   a transparent medium between said beam splitter and said matrix of retroreflectors having an index of refraction higher than that of air, for guiding said light rays along said light path from said object to said image.

2. The device of claim 1, wherein the transparent medium comprises a prism.

3. The device of claim 1, wherein the transparent medium comprises a plurality of prisms.

4. The device of claim 1, wherein the transparent medium comprises a fluid.

5. The device of claim 1, wherein said matrix of retroreflectors comprises triple mirror cube corners integral with said transparent medium.

6. The device of claim 1, wherein said matrix of retroreflectors includes a curved surface to focus specular rays resulting from reflection at a medium-retroreflector matrix interface to infinity.

7. The device of claim 3, wherein said prisms include scrambler surfaces proximate to said object and said image viewing area for reducing the intensity of visible secondary images resulting from reflection at a medium-retroreflector matrix interface.

* * * * *